(12) United States Patent
Grah et al.

(10) Patent No.: US 8,239,520 B2
(45) Date of Patent: Aug. 7, 2012

(54) NETWORK SERVICE OPERATIONAL STATUS MONITORING

(75) Inventors: Adrian Grah, Kanata (CA); George Papandreou, Ottawa (CA); Lyle Strub, Ottawa (CA)

(73) Assignee: Alcatel Lucent, Paris (FR)

( * ) Notice: Subject to any disclaimer, the term of this patent is extended or adjusted under 35 U.S.C. 154(b) by 748 days.

(21) Appl. No.: 11/696,970

(22) Filed: Apr. 5, 2007

(65) Prior Publication Data

US 2008/0247320 A1    Oct. 9, 2008

(51) Int. Cl.
*G06F 15/173* (2006.01)

(52) U.S. Cl. .................. 709/224; 709/223; 714/47.1

(58) Field of Classification Search .......... 709/223–224; 714/47.1
See application file for complete search history.

(56) References Cited

U.S. PATENT DOCUMENTS

| | | | | |
|---|---|---|---|---|
| 6,332,163 | B1 * | 12/2001 | Bowman-Amuah | 709/231 |
| 6,941,306 | B2 | 9/2005 | Kim | |
| 7,120,688 | B1 * | 10/2006 | Nguyen et al. | 709/224 |
| 7,206,975 | B1 * | 4/2007 | Wilding | 714/47.1 |
| 7,505,872 | B2 * | 3/2009 | Keller et al. | 702/186 |
| 7,581,006 | B1 * | 8/2009 | Lara et al. | 709/226 |
| 7,904,759 | B2 * | 3/2011 | Nordstrom | 714/47.1 |
| 2003/0212788 | A1 * | 11/2003 | Wilding et al. | 709/224 |
| 2004/0103186 | A1 * | 5/2004 | Casati et al. | 709/224 |
| 2004/0111506 | A1 | 6/2004 | Kundu et al. | |
| 2005/0132030 | A1 | 6/2005 | Hopen et al. | |
| 2005/0262237 | A1 * | 11/2005 | Fulton et al. | 709/224 |
| 2006/0004777 | A1 | 1/2006 | Ringseth et al. | |
| 2006/0235983 | A1 * | 10/2006 | Layman et al. | 709/227 |
| 2007/0124431 | A1 * | 5/2007 | Sharma | 709/219 |
| 2007/0203974 | A1 * | 8/2007 | Baskey et al. | 709/203 |
| 2007/0294399 | A1 * | 12/2007 | Grossner et al. | 709/224 |
| 2008/0040469 | A1 * | 2/2008 | Nishi | 709/223 |
| 2008/0077652 | A1 * | 3/2008 | Grant et al. | 709/203 |
| 2008/0155327 | A1 * | 6/2008 | Black et al. | 714/27 |

FOREIGN PATENT DOCUMENTS

WO    WO 2004/086720 A1    10/2004

OTHER PUBLICATIONS

Jeckle, "Ping for SOAP—SOAPing", downloaded on Mar. 30, 2007 from http://www.jeckle.de/freeStuff/soaping/.

* cited by examiner

*Primary Examiner* — Duyen Doan
(74) *Attorney, Agent, or Firm* — Eckert Seamans Cherin & Mellott, LLC

(57) ABSTRACT

Network service operational status monitoring methods and apparatus are disclosed. Responsive to a service status request associated with a network service, an operational status of the network service is determined by an intermediary between a service status requester and the network service. The operational status is a service-specific operational status of the network service in some embodiments. Operational status may be determined through a multi-level procedure in which subsequent levels after a first level of the multi-level procedure are or are not performed depending on a result of a preceding level of the procedure. A multi-level procedure may involve a service connectivity check and a service operational check, for instance.

21 Claims, 3 Drawing Sheets

NETWORK SERVICE OPERATIONAL STATUS MONITORING

FIELD OF THE INVENTION

This invention relates generally to communications and, in particular, to monitoring operational status of network services.

BACKGROUND

Services for which information is distributed through a communication network may be referred to as network services. "Web services" are an example of network services, and represent the next generation of technology being used for automatically exchanging information between different applications over the public Internet and many private networks. Web services provide a framework for building web-based distributed applications, and can provide efficient and effective automated machine-to-machine communications.

From a technology point of view, web services are network accessible functions that can be accessed using standard Internet protocols such as HyperText Transfer Protocol (HTTP), extensible Markup Language (XML), Simple Object Access Protocol (SOAP), etc., over standard interfaces.

The real power of web services technology is in its simplicity. The core technology only addresses the common language and communication issues and does not directly address the onerous task of application integration. Web services can be viewed as a sophisticated machine-to-machine Remote Procedure Call (RPC) technology for interconnecting multiple heterogeneous untrusted systems. Web services take the best of many new technologies by utilizing XML technology for data conversion/transparency and Internet standards such as HTTP and Simple Mail Transfer Protocol (SMTP) for message transport.

One of the primary drivers behind the development and standardization of web services is the ability to facilitate seamless machine-to-machine application-level communications by providing a loose coupling between disparate applications. Such a loose coupling of applications allows applications on different servers to interoperate without requiring a static, inflexible interface between them. Applications using very different technologies can interoperate using standard web services protocols.

A significant problem faced by network and application administrators in respect of network services, or more generally network applications by which network services are exposed to users, is the ability to monitor the actual operational status of network services. Such monitoring may be important for such purposes as Service Level Agreement (SLA) verification, network debugging, billing, etc. However, no standards currently exist for SOAP web service liveliness monitoring, or more generally for network service operational status monitoring.

Background information on SOAP-XML for web services can be found, for example, in U.S. Pat. No. 6,941,306, issued Sep. 6, 2005, and entitled "METHOD AND SYSTEM FOR ACCESSING DATA BY USING SOAP-XML".

United States Patent Application Publication No. 2006/0004777, published Jan. 5, 2006, and entitled "SYSTEM AND METHODS FOR PROVIDING A DECLARATIVE SYNTAX FOR SPECIFYING SOAP-BASED WEB SERVICES" describes a system and methods that make compile-time declarative modeling available for SOAP-based data transmission(s) to minimize the amount of coding required of a developer. Underlying details regarding the SOAP protocol, dispatching to the appropriate object and function, marshaling and un-marshaling of XML and generating the SOAP response are hidden from the developer when implementing SOAP-based Web services. The task of creating a SOAP-based web service is thus greatly simplified by reducing the number and complexity of considerations required of the developer when generating SOAP-based Web services. This patent application publication also provides information on the cause and handling of "SOAP:mustUnderstand" message fault conditions.

One form of service monitoring is described in United States Patent Application Publication No. 2004/0111506, published Jun. 10, 2004, and entitled "SYSTEM AND METHOD FOR MANAGING WEB UTILITY SERVICES". A performance management system and method for cluster-based web services involve a gateway for receiving a user request, assigning the user request to a class, queuing the user request based on the class, and dispatching the user request to one of a plurality of server resources based on the assigned class and control parameters. The control parameters are continuously updated by a global resource manager which tracks and evaluates system performance. This solution, however, does not provide per-service indications of service operational status.

A utility that can be used to elicit a small and simple response from a web service host is currently available, but requires an echo-web service at the server side. This type of approach for web service monitoring is thus only feasible where an echo-web service is provided at each web service host.

SUMMARY OF THE INVENTION

There remains a need for improved techniques for monitoring operational status of network services such as web services.

Some embodiments of the invention may provide a network service operational status or "liveliness" mechanism that is responsible for auditing web services liveliness and connectivity. This may entail requests and responses traversing a multitude of SOAP/XML aware intermediate devices. Such monitoring may ultimately result in a matrix of liveliness and connectivity for any monitored network service, which can be used for SLA verification, debugging, billing, etc.

An active or passive monitoring scheme may be provided. In some implementations, both active and passive schemes are combined. Certain conditions detected during passive monitoring could cause an intermediary device in a communication network to initiate an active network service monitoring task, for example.

According to an aspect of the invention, an apparatus includes an interface that is operable to enable communication with a service status requester, and an operational status monitor operatively coupled to the interface. The operational status monitor is operable to receive from the service status requester, through the interface, a service status request associated with a network service, and to determine an operational status of the network service responsive to the received service status request. The operational status is a service-specific operational status of the network service.

The network service may be one of a plurality of network services that are supported at a server.

The apparatus may also include a service interface operatively coupled to the operational status monitor and operable to enable communication with the network service, in which case the operational status monitor may be operable to determine an operational status of the network service by monitoring communication traffic associated with usage of the network service.

In some embodiments, the apparatus includes a service interface operatively coupled to the operational status monitor and operable to enable communication with the network service. The operational status monitor may then be operable to determine an operational status of the network service by transmitting a status message to the network service through the service interface, and monitoring the service interface for a response to the status message from the network service.

The operational status monitor may be further operable to determine whether the monitored communication traffic satisfies an active operational status monitoring criterion, and, if it is determined that the monitored communication traffic satisfies the active operational status monitoring criterion, to transmit a status message to the network service through the service interface, and to monitor the service interface for a response to the status message from the network service.

In this case, the operational status monitor may be further operable to determine whether the received service status request is compatible with the network service, to transmit the received service status request, as the status message, to the network service through the service interface where it is determined that the received service status request is compatible with the network service, and to transmit the status message in a form that is compatible with the network service where it is determined that the received service status request is not compatible with the network service.

The operational status monitor may also be operable to determine whether a received response to the status message is compatible with the service status requester, to transmit the received response to the service status requester through the interface where it is determined that the received response is compatible with the service status requester, and to transmit a service status response message in a form that is compatible with the service status requester where it is determined that the received response is not compatible with the service status response requester.

The status message and the response may be part of an active monitoring mechanism implemented by the operational status monitor. The active monitoring mechanism may also involve an exchange of a second status message and a second response between the operational status monitor and the network service through the service interface.

A method is also provided, and includes receiving from a service status requester a service status request associated with a network service, and determining an operational status of the network service responsive to the received service status request, the operational status being a service-specific operational status of the network service.

The operation of determining may involve monitoring communication traffic associated with usage of the network service.

Determining may also or instead involve transmitting a status message to the network service, and monitoring for a response to the status message from the network service.

In some embodiments, determining also involves determining whether the monitored communication traffic satisfies an active operational status monitoring criterion, and, where it is determined that the monitored communication traffic satisfies the active operational status monitoring criterion, transmitting a status message to the network service and monitoring for a response to the status message from the network service.

The method may also include determining whether the received service status request is compatible with the network service, transmitting the received service status request, as the status message, to the network service where it is determined that the received service status request is compatible with the network service, and transmitting the status message in a form that is compatible with the network service where it is determined that the received service status request is not compatible with the network service.

A response to the status method may similarly be considered to determine whether a received response to the status message is compatible with the service status requester. The method may then include transmitting the received response to the service status requester where it is determined that the received response is compatible with the service status requester, and transmitting a service status response message in a form that is compatible with the service status requestor where it is determined that the received response is not compatible with the service status response requester.

As noted above, the status message and the response may be part of an active monitoring mechanism that also involves exchanging a second status message and a second response with the network service.

Such a method may be implemented, for example, as instructions stored on a computer-readable medium.

Another aspect of the invention provides an apparatus that includes a service interface operable to enable communication with a network service, and an operational status monitor operatively coupled to the service interface and operable to perform a multi-level service operational status determination procedure to determine an operational status of the network service. The operational status monitor determines whether subsequent levels after a first level of the multi-level operational status determination procedure are to be performed based on a result of a preceding level of the procedure.

Each level of the multi-level service operational status determination procedure may involve transmitting a respective status message to the network service through the service interface, and monitoring the service interface for a response to the respective status message.

The multi-level service operational status determination procedure may include the first level for determining connectivity of the network service, and a second level for determining operational status of the network service.

The operational status monitor may be operable to perform the first level of the multi-level service operational status determination procedure by transmitting a HyperText Transfer Protocol (HTTP) message to the network service and monitoring the service interface for a response to the HTTP message.

The second level of the multi-level service operational determination procedure may involve the operational status monitor transmitting to the network service, through the service interface, a message for invoking a fault response by the network service, and monitoring the service interface for an indication of the fault response. The message may be a Simple Object Access Protocol (SOAP) message, for example.

In some embodiments, the operational status monitor is further operable to monitor communication traffic associated with usage of the network service, to determine whether the monitored communication traffic satisfies an active operational status monitoring criterion, and, if it is determined that the monitored communication traffic satisfies the active operational status monitoring criterion, to perform the multi-level service operational status determination procedure.

A method according to a further embodiment of the invention includes performing a first level of a multi-level service operational status determination procedure for determining an operational status of a network service, and, for each subsequent level after the first level of the multi-level operational status determination procedure, determining, based on a result of a preceding level of the procedure, whether the subsequent level is to be performed, and performing the subsequent level of the procedure where it is determined that the subsequent level of the procedure is to be performed.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
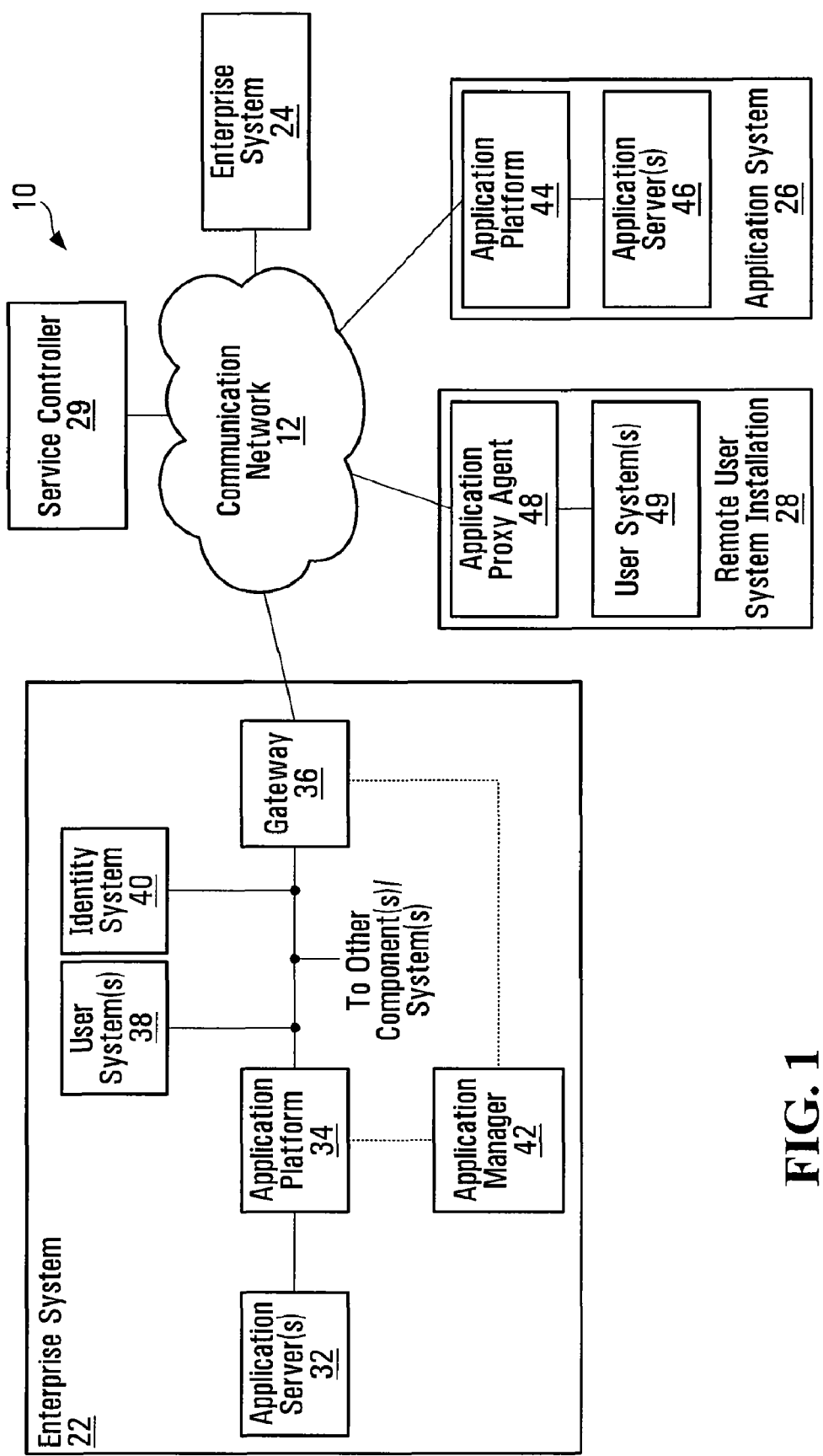
FIG. 1 is a block diagram of a communication system.

FIG. 1 is a block diagram of a communication system in which embodiments of the invention may be implemented. The communication system 10 includes a communication network 12, to which enterprise systems 22, 24, an application system 26, a remote user system installation 28, and a service controller 29 are operatively coupled through respective communication links.

The enterprise system 22 includes one or more application servers 32, an application platform 34 operatively coupled to the application server(s), a gateway 36 operatively coupled to the application platform and to the communication network 12, one or more user systems 38 operatively coupled to the application platform and to the gateway, an identity system 40 operatively coupled to the application platform, to the user system(s), and to the gateway, and an application manager 42 operatively coupled to the application platform and to the gateway. Other components or systems, such as firewalls located on either side of the gateway 36 to provide a DeMilitarized Zone (DMZ), may also be deployed. The enterprise system 24 may have a similar structure.

In the application system 26, an application platform 44 is operatively coupled to the communication network 12 and to one or more application servers 46. The remote user system installation 28 includes an application proxy agent 48 operatively coupled to one or more user systems 49.

Although many enterprise systems, application systems, remote user system installations, service controllers, and possibly other types of systems may be provided in a communication system, only illustrative examples of certain types of systems have been shown in FIG. 1 to avoid overly complicating the drawing. Internal details of the communication network 12, such as border or access equipment and core switching/routing components, and the enterprise system 24 have also been omitted from FIG. 1 for similar reasons. The type, structure, and operation of the communication network 12 may vary between deployments of embodiments of the invention. Other embodiments of the invention may also include enterprise systems, application systems, and/or remote user system installations that include fewer, further, or different components, with similar or different interconnections, than shown.

It should therefore be appreciated that the communication system 10 of FIG. 1, as well as the contents of the other drawings, are intended solely for illustrative purposes, and that the present invention is in no way limited to the particular example embodiments explicitly shown in the drawings and described herein.

Those skilled in the art to which the present invention pertains will be familiar with many different types of communication networks, including overlay networks such as application layer networks and more traditional infrastructures. The present invention is not limited to any particular type of communication network. In one embodiment, the communication network 12 is the Internet or some other public network.

Many examples of access technologies through which the systems 22, 24, 26, 28, 29 access the communication network 12 will also be familiar to those skilled in the art, and accordingly have not been separately shown in FIG. 1.

Considering first the enterprise system 22, an application server 32 supports applications that may provide functions, illustratively services, for use by at least the local user system(s) 38. Where multiple application servers 32 are deployed, each server supports a respective set of functions or services, which may or may not overlap the services supported by other servers.

In some embodiments, these functions are also made available for use by external user systems, such as user systems in the enterprise system 24, where owners or operators of the enterprise systems 22, 24 have an agreement for inter-system access by their users, and/or the user system(s) 49 at the remote user system installation 28. The service controller 29 may be involved in managing the usage of services, which are provided by service provider systems such as the application server(s) 32 within one administrative domain, by external network service consumers such as the user system(s) 49.

References herein to use of applications are intended to convey the notion of any such function. Generally, an application server 32 executes a software application to provide these functions. A service, such as a web service, is an example of an application function that is exposed to user systems, in the context of the present disclosure. Any references to applications, functions, and services should be interpreted accordingly.

An application server 32 may include such components as one or more processors, one or more memory devices, and an interface for exchanging application transaction information, such as service request messages and corresponding responses, with user systems. Memory devices in an application server 32 may be used to store operating system software, application software, etc., for use by the application server processor(s). Enterprise systems such as 22 are often implemented as a network, in which case a network interface enables the application server(s) 32 to communicate with the user system(s) 38 and possibly other components of the enterprise system. In another possible implementation, an application server 32 includes separate interfaces for communicating with different enterprise system components.

A user system 38 may similarly include one or more processors, one or more memory devices, and some sort of interface(s) for communicating with the application server(s) 32, and possibly other components of the enterprise system 22. Operating system software, client software for interacting with the application server(s) 32, and/or other types of information may be stored in user system memory devices.

Those skilled in the art will be familiar with many different types of systems that provide and/or use network applications and the services exposed by such applications. Embodiments of the present invention relate primarily to monitoring the operational status of network services, as opposed to how these services are actually supported, and accordingly the application server(s) 32, the user system(s) 38, and their operation are described only briefly herein to the extent necessary to illustrate aspects of the invention.

The identity system 40 represents another component that is commonly provided in enterprise systems such as corporate networks and will be familiar to those skilled in the art. Access to services or other functions supported by the application server(s) 32 in many cases must be restricted to a particular set of users. The identity system 40, which may authenticate users and/or user systems through interaction with a Lightweight Directory Access Protocol (LDAP) directory or other type of user database, for example, supplies a digital identity that may be used for authorizing or denying access to network services.

In terms of structure, the application platform 34 includes application server interfaces that are compatible with the user system interfaces, illustratively Application Programming Interfaces (APIs), of the application server(s) 32, one or more interfaces compatible with the application server interface(s) of the user system(s) 38, and components for processing messages or other information received and/or transmitted through these interfaces. As described in further detail below, external user systems may be able to access the application server(s) 32 through the gateway 36, in which case the user system interface(s) of the application platform 34 may also enable the application platform to communicate with the gateway 36. However, in some embodiments, a separate gateway interface may be provided for this purpose.

The gateway 36 would also include one or more internal interfaces compatible with interfaces of other components of the enterprise system 22, one or more external interfaces for enabling communication signals to be transmitted and/or received through the communication network 12, and intermediate components for processing signals received and/or transmitted through the interfaces.

The application manager 42 represents a control or monitoring element that might not itself perform real-time processing of information as it is transferred between the application server(s) 32 and the local user system(s) 38 or external user systems. The application manager 42 may communicate with the application platform 34 and the gateway 36 through compatible interfaces, to perform such functions as configuring the application platform and/or the gateway, illustratively by downloading policies to the platform and/or the gateway for enforcement.

Figure 2:
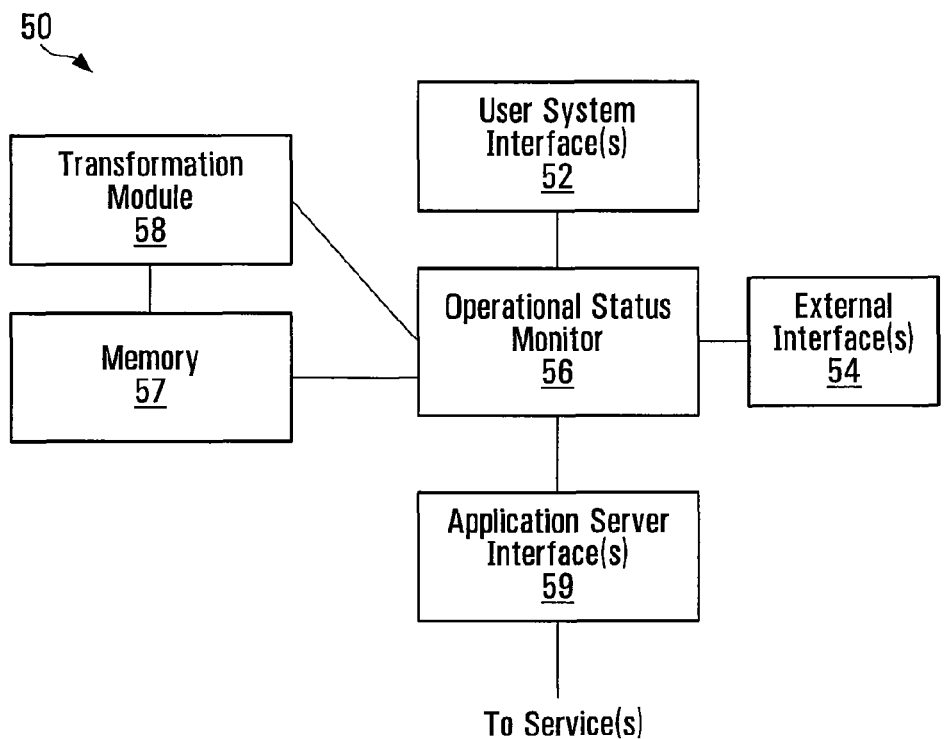
FIG. 2 is a block diagram of an operational status monitoring apparatus.

The internal components of the application platform 34, the gateway 36, and the application manager 42 may be implemented in hardware, software, firmware, or some combination thereof. An apparatus as described below with reference to FIG. 2 provides an illustrative example of a subsystem that may be provided in the application platform 34 or the gateway 36.

In a traditional deployment of a so-called Service Oriented Architecture (SOA) for an enterprise network, SOA components are individually deployed and integrated on each application server. Publishing a service for use on a network, within the enterprise system 22 for instance, would require a service registry for discovery and management of service offerings. Although web service standards address the need to restrict service access to authorized users, a web services policy server would be needed to store and provide this information. Enforcing these policies can also be a challenge, in that software vendors may require substantial changes to applications and servers in order to adapt to enterprise systems.

All of this can represent a significant project for an enterprise, and may well have a relatively long implementation cycle. In addition, the skill set required to implement such a project is highly specialized, which might make an SOA implementation not economically feasible.

When extending web services or other types of applications to partners, between the enterprise systems 22, 24, for example, even more challenges exist for an SOA infrastructure deployed on application servers. For instance, applications deployed at partner sites might use diverse security mechanisms that cannot share user identity information freely, requiring translation of security tokens for users. Placing the burden of security token translation, or other security functions, on each application server tends to be costly and inefficient.

Data privacy requirements are also very difficult or even impossible to enforce at each application server since application servers themselves might not be aware of whether a user system, or more generally a consumer of its service, is external to its enterprise system.

XML-specific denial of service (XDoS) attacks, and possibly other threats, may be particularly problematic in application server-based SOA implementations. Web services, for example, are open to XDoS attacks, which cannot be effectively dealt with on application servers.

The migration of server-based SOA to a web services model to achieve application interoperability via loosely coupling applications necessitates the need for additional messaging, illustratively in the form of SOAP headers and XML messages, as well as additional processing requirements for managing these messages. This additional overhead consumes network bandwidth and can result in significant new requirements for application server hardware.

An alternate model for deployment of an SOA infrastructure is to integrate the SOA components into enterprise network elements, as shown in FIG. 1. The application platform 34, the gateway 36, and the application manager 42 represent SOA components in the enterprise system 22.

Deploying the SOA infrastructure separately from the application server(s) 32 may provide several benefits: the SOA infrastructure is then application agnostic, applications require minimal modification, the SOA infrastructure is an end-to-end integrated solution, application server processing overhead is minimized, and network bandwidth can be optimized.

With an enterprise system-/network-based SOA deployment, any message translations required for applications to interoperate can be performed according to policies set within the enterprise system, not by the applications themselves. This allows translations to be defined independently of applications, removing the reliance on application vendor implementations.

The business logic for adapting message format and content is thus provided by the enterprise, not by the application, minimizing application modification. Web services messages, for example, can be adapted within an enterprise network to achieve application interoperability. As new interoperability requirements arise, perhaps due to merger, acquisition, or the need to integrate with a new partner, no application modification is required. New policies for message translation can instead be defined to provide for the new interoperability.

An SOA infrastructure deployed as an integrated enterprise network solution can provide effective monitoring, control, and reporting points, illustratively the gateway 36, the application platform 34, and/or the application manager 42. This can be important to enable proper corporate governance, continuous corporate improvement, and the ability to demonstrate compliance with regulations concerning data privacy and network security, for instance.

Application server processing requirements for application interoperability can be significantly reduced for two reasons: application server offload and a reduced number of required translations. Translations can be done once, at the application platform 34 or the gateway 36, for example, and then forwarded on to multiple destinations rather than each application performing its own translation.

The network bandwidth consumed by additional message traffic can be reduced by routing packets to the application server(s) 32 based upon inspecting the message SOAP headers, XML tags, or other message content. Routing can be sensitive to application contexts rather than based on static IP addresses, for example.

If application server functions are to be extended to partner enterprise systems, an SOA infrastructure deployed as enterprise network infrastructure may provide many further advantages. Translation of security tokens can be done once at the demarcation point between the partners' networks, illustratively at the gateway 36 for external accesses to the application server(s) 32, providing a single enforcement point for security policy. Data privacy can also be enforced at the point where data leaves a security domain, again at the gateway 36, for example. This drives efficiencies and reduces costs. In addition, denial of service attacks targeted at corporate web services can be defended at the gateway 36, the enterprise network edge, which is perhaps the most secure place to deal with this issue. In accordance with an aspect of the invention, monitoring of operational status of network services can also or instead be provided by one or more SOA infrastructure components.

The application platform 34 provides an SOA infrastructure for integrating applications that traditionally have run as stand-alone applications, and may enable such capabilities as controlling and monitoring all activity initiated by a validated user to thereby allow generation of a consolidated audit trail, translation for message and document formats, managing the life cycle for applications including the staged rollout of web services and rollback to previous versions in the event of unexpected behavior for instance, and monitoring application/service performance to ensure that applications/services meet internal corporate requirements.

This listing of example functions of the application platform 34, like other functional examples noted herein, is by no means restrictive or exhaustive. Many functions may be implemented independently, every embodiment need not necessarily provide all functions, and other functions may also be or become apparent to those skilled in the art.

Benefits of the application platform 34 may include reduced application integration cost through minimum change to existing applications, as noted above, ensuring that access to corporate applications complies with Government regulations, a central monitoring and control point for employee access to web services, and continuous corporate improvement through consolidated reporting.

The gateway 36 effectively extends an intranet SOA provided by the enterprise system 22, through the communication network 12, into an extranet, allowing seamless integration with customers and partners without compromising security or privacy. Functions of the gateway 36 may include, possibly among others, any or all of extending applications to a partner extranet and branch locations, providing seamless mobility for partner access to applications, ensuring partner access to corporate applications complies with Government regulations, maintaining privacy of corporate identities without compromising traceability, and operational status monitoring for network services provided by the application server(s) 32.

In providing mobile access to the application server(s) 32 from any partner sites associated with the enterprise system 22, the gateway 36 may allow the secure identification of partner institutions and acceptance of identities between different security domains. Application message and data translations, for user systems associated with external partner sites, may also be provided by the gateway 36, while ensuring that all data remains private as per corporate policy. A consolidated audit trail of all application access may be collected and provided to an external partner enterprise system by the gateway 36, to demonstrate conformance with regulations for instance.

The application manager 42 provides a central point for control, and possibly monitoring, of the application platform 34, the gateway 36, and any other platforms and gateways (not shown) in the enterprise system 22. Globally consistent policies for all applications, so as to ensure improved corporate governance and/or compliance with Government regulations, can also be established in some embodiments through the application manager 42 and distributed to the application platform 34 and to the gateway 36 for enforcement. The central application manager 42 may also provide for globally consistent application change management.

As noted above, the enterprise system 24 may be substantially similar to the enterprise system 22.

The enterprise system 22 includes both application server(s) 32 that support applications and one or more user system(s) 38 that may use those applications. However, it should be appreciated that application servers and user systems need not necessarily be co-located. The application system 26, for example, includes one or more application servers 46, but no local user systems. Although only an application platform 44 is shown in the application system 26, some implementations of an application system might also include a gateway. Whereas the application system 26 as shown might be suitable, for example, for a remote data center that is associated with a primary data center as the enterprise system 22, a stand-alone or "unaffiliated" application system that hosts applications for use by external user systems might also include a gateway for handling authentication of the external users for instance.

The application platform 44 in the application system 26 may interact with the application manager 42 of the enterprise system 22, or more generally the application manager of an affiliated enterprise system. In the case of a stand-alone application system, a local application manager may be provided. In some implementations, the external service controller 29 interacts with SOA infrastructure components in multiple different domains.

A user-only deployment is shown in FIG. 1 as the remote user system installation 28. The application proxy agent 48 allows the user system(s) 49 at a partner or branch location, for example, to use applications provided by remotely located application servers. In one embodiment, the application proxy agent 48 is a scaled-down version of the gateway 36. The application proxy agent 48, like the gateway 36, might maintain privacy of corporate identities during authentication of the user system(s) 49 with the enterprise system 22 without compromising traceability, and support secure communications through the communication network 12 using tunnelling techniques, for example, but need not necessarily be able to authenticate external users since the remote user system installation 28 does not host applications that could be used by external user systems.

The external service controller 29 provides for external management of the sharing of network services between the systems 22, 24, 26, 28, but need not itself include or operate in conjunction with local service provider systems or service consumer systems. A service controller such as 29 might therefore include a service registry system and a network interface through which network service information and service discovery information may be exchanged with the systems 22, 24, 26, 28.

In operation, a user system 38 that wishes to make use of an application provided by an application server 32 is first authenticated by the identity system 40. Those skilled in the art will be familiar with many security schemes that may be used for this purpose, such as username/password authentication. Where remote access to an application server 32 is supported, user authentication may be handled by the gateway 36, possibly through interactions with an external identity system. The gateway 36 may also be involved in authentication when a user system that is associated with a partner enterprise system or site is locally connected to the enterprise system 22 and wishes to access an application server 32.

When a user has been authenticated, messages or other forms of information may be exchanged between a user system and the application server(s) 32. A user may be allowed to access multiple applications after a single successful authentication.

As noted above, improved techniques for monitoring the operational status of network services are needed. For example, a user or other party may wish to confirm that a network service is actually operational before a service request is generated.

FIG. 2 is a block diagram of an operational status monitoring apparatus according to an embodiment of the invention. The apparatus 50 includes one or more user system interface (s) 52, one or more external interface(s) 54, an operational status monitor 56 operatively coupled to the user system interface(s), to the external interface(s), to a memory 57, to a transformation module 58, and to one or more application server interface(s) 59. The memory 57 is also operatively coupled to the transformation module 58 in the example apparatus 50.

As noted above with reference to FIG. 1, the contents of the drawings are intended solely for the purposes of illustration. A device or system in which or in conjunction with which the apparatus 50 is implemented may include additional components that have not been explicitly shown, for example. These components might take various forms depending on the point at which, or the device(s)/system(s) in which or in conjunction with which, the apparatus 50 is implemented. In general, other embodiments of an apparatus may include further, fewer, or different components than explicitly shown, with similar or different interconnections.

The types of connections through which the components of FIG. 2 are operatively coupled may, to at least some extent, be implementation-dependent. Electronic devices often use various types of physical connectors and wired connections. In the case of cooperating software functions, for example, an operative coupling may be through variables, registers, or commonly accessed areas of a memory, and thus include a logical coupling.

Hardware, software, firmware, or combinations thereof may be used to implement components of the apparatus 50. Processing elements such as microprocessors, microcontrollers, Programmable Logic Devices (PLDs), Field Programmable Gate Arrays (FPGAs), Application Specific Integrated Circuits (ASICs), Network Processors (NPs), and other types of "intelligent" integrated circuits may be suitable for this purpose.

The apparatus 50 may interact with other components of a local communication network and a partner network through the interfaces 52, 54, 59. These interfaces may be of the same type or different types, or even be the same interface where the same communication medium is used for information transfers with all other components. However, in many implementations, it is likely that the user system interface(s) 52 will differ from at least the application server interface(s) 59, and that multiple application server interfaces of different types may be provided for different application servers. The external interface(s) 54 may include one or more interfaces of other different types.

A user system interface 52 enables the apparatus 50 to exchange application access information such as web service messages with user systems. Each application server interface 59 similarly allows the apparatus 50 to exchange application access information with a respective set of one or more local application servers, or more generally enables communication with network services.

This type of architecture for the apparatus 50 might be appropriate, for example, when the apparatus is implemented at a gateway for monitoring network service operational status by monitoring information such as service messages associated with usage of locally hosted applications, since a gateway might handle all application access information for an enterprise system.

However, it should be appreciated that other implementations are also possible. In general, the apparatus 50 might be implemented at any service operational status monitoring point. For an implementation of the apparatus 50 at the application platform 34 (FIG. 1), for example, the external interface(s) 54 might include an interface that is compatible with the gateway 36 rather than the communication network 12. Thus, the types and numbers of the interfaces 52, 54, 59 might vary depending upon the location of a monitoring point, but monitoring points may perform at least substantially similar functions as disclosed herein regardless of their location.

Through the external interface(s) 54, the apparatus 50 may exchange information with remote application servers and/or user systems. In the system of FIG. 1 for instance, exchanges between the enterprise systems 22, 24 may involve transfer of information through the communication network 12 and appropriate network interfaces at the enterprise systems. Network interfaces compatible with the communication network 12 may be provided at the gateway 36 and a corresponding gateway at the enterprise system 24. According to embodiments of the invention, the gateways in enterprise systems may be responsible for handling requests relating to the operational status of network services and for monitoring network services. Operational status monitoring could also or instead be provided at application platforms 34, 44, the application proxy agent 48, or at other points along a service path between application servers and user systems.

The structure and operation of the interfaces 52, 54, 59 will be dependent to at least some extent on the communication media and protocols used in information transfers. Those skilled in the art will be familiar with many types of interfaces.

It should be appreciated, for example, that the apparatus 50 need not itself be actively involved in transferring application access information such as service messages. The operational status monitor 56 at a gateway might passively "listen" for service messages without having any involvement in actually routing such messages into or out of an enterprise network for instance.

The memory 57 may include one or more memory devices. Solid state memory devices are common in electronic equipment. Other types of memory devices, including devices for use with movable or even removable storage media may also or instead be used.

Other components of the apparatus 50 may be implemented using hardware, software, and/or firmware. Based on the descriptions of the various functions of these components provided herein, a person skilled in the art will be enabled to implement network service operational status monitoring techniques according to embodiments of the invention in any of various ways.

As discussed above, the interfaces 52, 54 enable the apparatus 50 to communicate with other systems, including local user systems and external gateways, for example. These and other systems represent examples of service status requesters. References herein to a service status requester are intended to generally denote any system or entity that might request an update as to the operational status of a network service. A service status request could therefore be received through a user system interface 52, an external interface 54, or possibly through an application server interface 59 in some embodiments.

The operational status monitor 56 is operable to receive service status requests associated with one or more network services from service status requesters. Responsive to a request, the operational status monitor 56 determines an operational status of the network service.

It should be noted that this operational status is a service-specific operational status of the network service in some embodiments. As those skilled in the art will appreciate, a network service may be one of a plurality of network services supported at a single server. Although there may be existing techniques for providing indications of service status based on the health or status of a server on which the service is supported, embodiments of the present invention allow a service-specific operational status to be determined. The fact that a server is operating properly, for example, does not necessarily mean that all services supported on that server are also operational. This scenario is illustrative of the value of service-specific operational status.

An application server interface 59 enables the apparatus 50 to communication with one or more network services. As noted above, a network service may be a function that is exposed by a network application, and thus an application server interface 59 is one example of a service interface. In some embodiments, the operational status monitor 56 determines the operational status of a network service by monitoring communication traffic associated with usage of the network service by network service users. Access to this traffic may be provided by an application server interface 59. This monitoring function need not affect the actual transfer of service messages and other service-related communication traffic. The operational status monitor 56 might passively listen to service-related communication traffic without interrupting the flow of such traffic.

Active monitoring functions are also contemplated. Through an application server interface 59, for example, the operational status monitor 56 may transmit a status message to a network service, and then monitor that interface for a response to the status message from the network service. Examples of active monitoring messages and responses are described in further detail below.

Passive and active functions are not necessarily exclusive. Both types of functions may be provided by the same operational status monitor. For example, the operational status monitor 56 could passively monitor service-related communication traffic such as service requests and corresponding responses, and determine whether the monitored communication traffic satisfies an active operational status monitoring criterion. Monitoring criteria used to determine a change in operational status of a service could include one or more of: a mismatch between the number of requests and responses, more service request/response pairs than a threshold number observed within a certain time interval, fewer service request/response pairs than a threshold number observed within a certain time interval, no network service requests or responses observed within a timeout period, etc.

In the case where both active and passive monitoring are employed, active monitoring of services might be used only if no response messages are observed from a particular service within a configured time period and therefore the operational status of the service cannot be determined passively. In this case the operational status monitor 56 may invoke active monitoring for any or all network services whose operational status is indeterminate. As described above for instance, the operational status monitor 56 might transmit a status message to the network service through an application server interface 59 and then monitor the interface for a response to the status message from the network service.

One possible alternative for an active monitoring mechanism would be to require a particular status function on all network applications and/or network services. Service status requesters would then be able to contact every network service directly for status updates. However, this would require agreement on a standardized status function by all application/service developers, as well as cooperation by all developers to implement such a function.

A gateway or other SOA component such as those shown in FIG. 1 may be used as an intermediary between network services and service status requesters to avoid the need for every application/service to provide this function.

In the system of FIG. 1, for example, a network service user might not be able to directly interact with an application server or a network service. An external user outside of the enterprise system 22 interacts with the application server(s) 32 indirectly, through the gateway 36. Therefore, since all communications between the external user and the local network services are handled by the gateway 36, the gateway could also be used to provide a status function for the local network services. The network services themselves could, but need not necessarily, implement such a function.

This type of intermediary implementation may potentially involve transforming received service status requests or otherwise generating status messages to be transmitted to a network service. The operational status monitor 56 may thus determine whether a received service status request is compatible with the network service. This determination may be based on service information stored in the memory 57 or in a service registry, for example.

A received service status request that is compatible with the network service can be transmitted to the network service through an application server interface 59. This situation may occur where a network service does provide its own status function. Thus, the deployment of an operational status intermediary does not necessarily preclude network service developers from including status functions in network applications. If a network application provides a status function, then that function could be used by a gateway or other intermediary.

A non-compatible received service status request could be translated, reformatted, or otherwise processed into a form that is compatible with the network service. The operational status monitor 56 might transfer non-compliant service status requests to the transformation module 58 for appropriate processing. A non-compatible service status request might be a service status request that is not in the correct format for a status function supported by a network service, or a request relating to a network service that does not have an explicit status function.

The transformation module 58 may return a compatible status message to the operational status monitor 58 for transmission to the network service. In other embodiments, the transformation module 58 itself handles transmission of status messages to network services. Received service status requests could be passed to the transformation module 58 by the operational status monitor 56, for instance, with the transformation module then forwarding compatible requests to the associated network services and converting non-compatible requests into compatible status messages.

It should be noted that a received service status request need not necessarily be transformed into a status message that is to be transmitted to a network service. A status message might be a newly generated message that is not a transformed version of a received service status request, for example.

Status responses received from network services may also or instead be handled in a similar manner. For instance, the operational status monitor 56 may determine whether a received response to a status message is compatible with the service status requester from which the original service status request message was received. If so, the received response might be transmitted to the service status requester, illustratively through a user system interface 52 or an external interface 54. Where it is determined that a received response is not compatible with the service status requester, a service status response message, which may be a processed version of the received response or a newly generated message, is transmitted to the service status requester. The service status response message is in a form that is compatible with the service status requester.

An active monitoring mechanism that is implemented by the operational status monitor 56 may be a multi-level mechanism or procedure. A second status message and a second response are exchanged between the operational status monitor 56 and the network service through an application server interface 59 in some embodiments.

More generally, the operational status monitor 56 may be operable to perform a multi-level service operational status determination procedure to determine an operational status of the network service. In this case, the operational status monitor 56 determines whether subsequent levels after a first level of the multi-level operational status determination procedure are to be performed based on a result of a preceding level of the procedure. As will be apparent from the foregoing, each level of the multi-level service operational status determination procedure could involve transmitting a respective status message to the network service through a service interface, and monitoring the service interface for a response to the respective status message.

According to one embodiment of the invention, the first level the multi-level service operational status determination procedure is for determining connectivity of the network service, and the procedure also includes a second level for determining the actual operational status of the network service. The first level might involve transmitting an HTTP message to the network service and monitoring the service interface for a response to the HTTP message, for example.

An operational status verification could be performed only after connectivity is verified. For example, the operational status monitor 56 could perform an operational check by transmitting to the network service a message for invoking a fault response by the network service, and monitoring the service interface for an indication of the fault response. Illustrative examples of multi-level procedures are described in further detail below.

Considering active and multi-level monitoring in further detail, embodiments of the invention could provide request-based operational status monitoring that behaves as a "ping" type of function from the perspective of a service status requester. A service status requester, or the operational status monitor 56 in some embodiments, could be configurable to establish a preferred rate at which status updates are obtained for network services. In a SOAP-based implementation, service status requests, and possibly status messages to be sent to network services by the operational status monitor 56, can be generated by any SOAP/XML processing element. This may include any or all of user system clients, gateways, routers, load balancers, etc.

According to one multi-level procedure, the first level involves sending an HTTP message such as a GET message to the Uniform Resource Locator (URL) of a network service. If a valid (i.e., empty in this example) HTTP response is received, then a network service exists at this URL. This task is a "safe" operation in that if no service exists at that URL, then either the HTTP server will respond with an error code or the GET request will timeout. This type of check provides an indication only of the connectivity or existence of a network service at a particular location, and not its actual operational status.

To further test for a SOAP web service, a SOAP message with a mandatory (mustUnderstand) header that the network service will not understand could be used. For example, the SOAP message <ex:FailWithMustUnderstandFault s:mustUnderstand="true"/> specifies that if a SOAP processor understands and processes this header, this must result in generating a mustUnderstand fault, with no other processing being performed on this message. Such a message thus elicits fault processing or a fault response at a network service, and the operational status monitor 56 can monitor an application server interface 59 for an indication of the fault processing. Fault processing in this case is actually indicative that the network service is operational.

This type of procedure may be applied, for example, between a gateway and a local network service within an intranet such as within the enterprise system 22 of FIG. 1, between a remote gateway and a local gateway such as between the enterprise systems 22, 24 of FIG. 1, or in some embodiments between a gateway and a remote network service.

In the first and last of these examples, the gateway might attempt both the HTTP- and SOAP-based checks described above.

The foregoing HTTP- and SOAP-based checks are illustrative examples of the types of tasks that could be performed if a network application that exposes a network service does not include a status function. As noted above, an operational status monitor may use the status function of a network application or service if a status function exists, and otherwise use some other function such as the HTTP- and SOAP-based checks.

At least in the inter-gateway example, and other cases in which a gateway or other component acts as an intermediary, there may be may other options for monitoring network service operational status. An intermediate component could participate in interpreting URLs, translating or otherwise processing request/response payloads, and/or locally generating status responses, for instance.

For each network service virtual endpoint, which is used to access a network service, a uniquely coded URL can be used to shadow the URL of the virtual endpoint. For example, if URL of a virtual endpoint is http://gw1.enterprise.com/virtualep1, then the shadow endpoint might be http://gw1.enterprise.com/virtualep1/ping. Thus, any messages destined to the shadow endpoint could be interpreted and responded to by a gateway as service status requests. If the virtualep1 URL does not exist, the ping URL also will not exist. Processing of messages associated with such shadow endpoints can be handled by the operational status monitor 56. The operational status monitor 56 might respond to shadow endpoint messages with HTTP OK responses, for example.

One could alternatively implement a ping shadow endpoint as a network service, with various aspects of identity management and web services specifications also potentially being verified in addition to liveliness or operational status.

A further method of monitoring network service operational status through an intermediary would be to locally implement a SOAP status Remote Procedure Call (RPC) for each virtual endpoint. In this case, a single URL might be provided, with a gateway being configured to examine each SOAP request message for the status RPC. If the status RPC is found, the operational status monitor 56 may be called to process the request and create a response message. The gateway in this case determines that the message should not immediately be passed along to a network service, and sends the response created by the operational status monitor 56 back to the service status requester. This example also illustrates that the operational status monitor 56 may receive service status requests through other types of interfaces than a user system interface 52 or an external interface 54.

According to another possible variation, a gateway or other intermediary could monitor a single URL as above, but check an HTTP Soap Action tag for a status keyword. That keyword would be sufficient to trigger the operational status monitor 56 to generate a response if a network service exists.

A gateway or other intermediary device could be configured to intercept service status requests and respond on behalf of any network service. In some embodiments, an intermediary autonomously generates new status messages destined for further downstream elements, illustratively a network service in an example described above. Options within a service status request could be provided to control whether an intermediary responds on behalf of a network service or allows the request through toward its ultimate destination. Such request options could be used by the operational status monitor 56 to determine whether a network service does or does not have its own status function, for example. A hop count mechanism might also or instead be included, to trigger an intermediary that observes a count of 0 to respond on behalf of the ultimate network service. A unique encoding could be used to specify that only the network service itself responds.

The notion of a gateway or other intermediary responding to a status request on behalf of a network service is further illustrative of another aspect of the invention. In particular, the operational status monitor 56 need not necessarily contact a network service every time a status request for that service is received. For example, the operational status monitor 56 might be configured to perform an active monitoring procedure periodically, and to store the results of this monitoring in the memory 57. In this case, processing of requests by the operational status monitor 56 might involve accessing the memory 57 to determine an operational status of a network service.

Considering one particular example, suppose that service operational status monitoring is implemented at both the gateway 36 (FIG. 1) and the application proxy agent 48, and that a user system 49 at the remote user system installation 28 sends to the application proxy agent 48 a service status request relating to a service that is supported by an application server 32. The application proxy agent 48 might forward the request, or possibly a transformed version of the request, to the gateway 36, since the service is actually accessed through the gateway. The gateway 36 might also forward the request or a transformed version thereof to the application server 32 on which the service is supported.

The application proxy agent 48 might instead determine that it should respond to the service status request rather than forwarding the request to the gateway 36. For example, passive monitoring of service-related communication traffic at the application proxy agent 48 might indicate that the service is operational, or a response to a previous status request might have been received by the application proxy agent from the gateway 36 less than a certain amount of time before the new request was received. If the new request is forwarded to the gateway 36, then the gateway might similarly make a determination as to whether to forward a status message to an application server 32 or to reply to the service status request directly on behalf of the network service.

Figure 3:
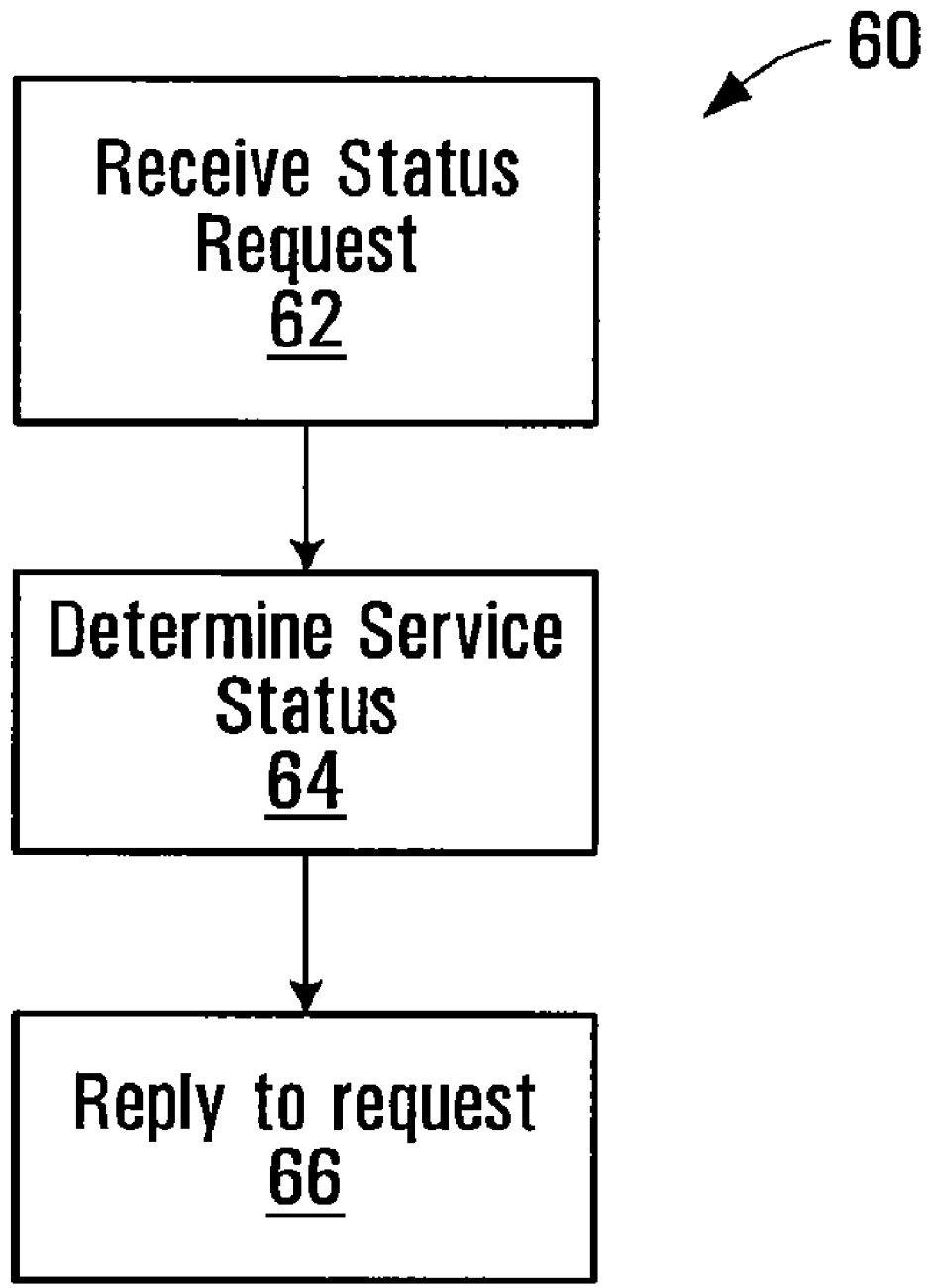
FIG. 3 is a block diagram of an operational status monitoring method.

FIG. 3 is a flow diagram of a network service operational status monitoring method. The method 60 begins at 62 with an operation of receiving from a service status requester a service status request associated with a network service. At 64, an operational status of the network service is determined responsive to the received service status request. In some embodiments, the determined operational status is a service-specific operational status of the network service. A reply or response to the request is made at 66, illustratively by sending a response message to the service status requester from which the request was received at 62.

The method 60 is illustrative of one embodiment of the invention. Other embodiments may involve performing fewer, additional, or different operations, and/or performing operations in a different order than shown. For example, passive and/or active monitoring may be an ongoing process, which is performed concurrently with the method 60. Thus, it should be appreciated that although status determinations may be responsive to received requests, the actual monitoring need not necessarily be invoked only when a request is received.

Determining an operational status of a network service at 64 may involve making a status determination based on stored monitoring results or invoking an active status determination procedure, for instance. This procedure is a multi-level procedure in some embodiments. Status request and response transformations represent additional operations that may be performed, but have not been explicitly shown in FIG. 3.

Further variations of the method 60 may be or become apparent to those skilled in the art. At least some of these variations will be apparent from the foregoing description of FIG. 2.

Embodiments of the invention may be implemented, for example, for auditing web services whose traffic may be required to transverse a multitude of intermediary SOAP/XML processing elements. In this case, liveliness monitoring may ultimately result in a matrix of liveliness and connectivity for web services as observed at any SOAP/XML processing element. Such a matrix may be stored in the memory 57 (FIG. 3), for example.

Any XML/SOAP aware device may potentially be able to verify the connectivity and liveliness of SOAP web services. Some embodiments are flexible enough to support passive and active monitoring and are able to traverse and verify a multitude of intermediate devices.

What has been described is merely illustrative of the application of principles of embodiments of the invention. Other arrangements and methods can be implemented by those skilled in the art without departing from the scope of the present invention.

For example, a gateway represents an example of a device at which network service operational status monitoring might be particularly useful. However, other elements, including a client application for instance, might be written to generate its own liveliness monitoring of the network services it connects to. Thus, the techniques disclosed herein could be implemented at other devices or systems than a gateway, and illustratively in any generic SOAP/XML intermediate device.

In addition, although described primarily in the context of methods and systems, other implementations of the invention are also contemplated, as instructions stored on a computer-readable medium, for example.

We claim:

1. An apparatus comprising:
an interface operable to enable communication with a service status requestor;
an operational status monitor operatively coupled to the interface and operable to receive from the service status requestor, through the interface, a service status request associated with a network service, and to determine an operational status of the network service responsive to the received service status request, the operational status being a service-specific operational status of the network service, and
a service interface operatively coupled to the operational status monitor and operable to enable communication with the network service,
wherein at least one of the interface, the service interface, and the operational status monitor is implemented using hardware,
the operational status monitor being operable to determine an operational status of the network service by monitoring communication traffic associated with usage of the network service, determining whether the monitored communication traffic satisfies an active operational status monitoring criterion, and, responsive to determining that the monitored communication traffic satisfies the active operational status monitoring criterion, transmitting a status message to the network service through the service interface, and monitoring the service interface for a response to the status message from the network service,
wherein the operational status monitor is further operable to determine whether the received service status request is compatible with the network service, to transmit the received service status request, as the status message, to the network service through the service interface where it is determined that the received service status request is compatible with the network service, and to transmit the status message in a form that is compatible with the network service where it is determined that the received service status request is not compatible with the network service.

2. The apparatus of claim 1, wherein the network service comprises one of a plurality of network services supported at a server.

3. The apparatus of claim 1, wherein the operational status monitor is further operable to determine whether a received response to the status message is compatible with the service status requestor, to transmit the received response to the service status requestor through the interface where it is determined that the received response is compatible with the service status requestor, and to transmit a service status response message in a form that is compatible with the service status requestor where it is determined that the received response is not compatible with the service status response requestor.

4. The apparatus of claim 1, wherein the status message and the response comprise an active monitoring mechanism implemented by the operational status monitor, the active monitoring mechanism further comprising an exchange of a second status message and a second response between the operational status monitor and the network service through the service interface.

5. A method comprising:
receiving from a service status requestor a service status request associated with a network service; and
determining an operational status of the network service responsive to the received service status request, the operational status being a service-specific operational status of the network service,
wherein determining comprises:
monitoring communication traffic associated with usage of the network service;
determining whether the monitored communication traffic satisfies an active operational status monitoring criterion; and
responsive to determining that the monitored communication traffic satisfies the active operational status monitoring criterion:
transmitting a status message to the network service; and
monitoring for a response to the status message from the network service, the method further comprising:
determining whether the received service status request is compatible with the network service;
transmitting the received service status request, as the status message, to the network service where it is determined that the received service status request is compatible with the network service; and
transmitting the status message in a form that is compatible with the network service where it is determined that the received service status request is not compatible with the network service.

6. The method of claim 5, further comprising:
determining whether a received response to the status message is compatible with the service status requestor;
transmitting the received response to the service status requestor where it is determined that the received response is compatible with the service status requestor; and
transmitting a service status response message in a form that is compatible with the service status requestor where it is determined that the received response is not compatible with the service status response requestor.

7. The method of claim 5, wherein the status message and the response comprise an active monitoring mechanism, the active monitoring mechanism further comprising:
exchanging a second status message and a second response with the network service.

8. A non-transitory computer-readable memory medium storing instructions which when executed perform a method comprising:
- receiving from a service status requestor a service status request associated with a network service; and
- determining an operational status of the network service responsive to the received service status request, the operational status being a service-specific operational status of the network service,
- wherein determining comprises:
- monitoring communication traffic associated with usage of the network service;
- determining whether the monitored communication traffic satisfies an active operational status monitoring criterion; and
- responsive to determining that the monitored communication traffic satisfies the active operational status monitoring criterion:
- transmitting a status message to the network service; and
- monitoring for a response to the status message from the network service, the method further comprising:
- determining whether the received service status request is compatible with the network service;
- transmitting the received service status request, as the status message, to the network service where it is determined that the received service status request is compatible with the network service; and
- transmitting the status message in a form that is compatible with the network service where it is determined that the received service status request is not compatible with the network service.

9. An apparatus comprising:
- a service interface operable to enable communication with a network service; and
- an operational status monitor operatively coupled to the service interface and operable to perform a multi-level service operational status determination procedure to determine an operational status of the network service responsive to a service status request from a service status requestor, the operational status monitor determining whether subsequent levels after a first level of the multi-level operational status determination procedure are to be performed based on a result of a preceding level of the procedure,
- wherein at least one of the service interface and the operational status monitor is implemented using hardware,
- the operational status monitor being operable to perform the first level of the multi-level operational status determination procedure by transmitting a status message to the network service through the service interface and monitoring the service interface for a response to the status message from the network service, wherein the operational status monitor is further operable to determine whether the service status request is compatible with the network service, to transmit the service status request, as the status message, to the network service through the service interface where it is determined that the service status request is compatible with the network service, and to transmit the status message in a form that is compatible with the network service where it is determined that the service status request is not compatible with the network service,
- the operational status monitor being operable to perform a second level of the multi-level service operational status determination procedure subsequent to the first level by transmitting to the network service, through the service interface, a message for invoking fault processing by the network service, monitoring the service interface for an indication that the fault processing has been performed by the network service, and determining the operational status of the network service based on whether the fault processing has been performed by the network service.

10. The apparatus of claim 9, wherein the multi-level service operational status determination procedure comprises the first level for determining connectivity of the network service, and the second level for determining operational status of the network service.

11. The apparatus of claim 10, wherein the status message comprises a Hyper Text Transfer Protocol (HTTP) message.

12. The apparatus of claim 9, wherein the message comprises a Simple Object Access Protocol (SOAP) message.

13. The apparatus of claim 9, wherein the operational status monitor is further operable to monitor communication traffic associated with usage of the network service, to determine whether the monitored communication traffic satisfies an active operational status monitoring criterion, and, responsive to determining that the monitored communication traffic satisfies the active operational status monitoring criterion, to perform the multi-level service operational status determination procedure.

14. A method comprising:
- performing a first level of a multi-level service operational status determination procedure for determining an operational status of a network service, responsive to a service status request from a service status requestor; and
- for each subsequent level after the first level of the multi-level operational status determination procedure:
- determining, based on a result of a preceding level of the procedure, whether the subsequent level is to be performed; and
- performing the subsequent level of the procedure where it is determined that the subsequent level of the procedure is to be performed,
- wherein performing the first level of the procedure comprises transmitting a status message to the network service and monitoring for a response to the status message from the network service, the method further comprising:
- determining whether the service status request is compatible with the network service;
- transmitting the service status request, as the status message, to the network service through the service interface where it is determined that the service status request is compatible with the network service; and
- transmitting the status message in a form that is compatible with the network service where it is determined that the service status request is not compatible with the network service,
- wherein performing the subsequent level of the procedure comprises performing a second level of the procedure subsequent to the first level by transmitting to the network service a message for invoking fault processing by the network service, monitoring for an indication that the fault processing has been performed by the network service, and determining the operational status of the network service based on whether the fault processing has been performed by the network service.

15. The apparatus of claim 9, wherein the message comprises a mandatory header specifying that a fault must be generated where the mandatory header is understood and processed by the network service, the fault comprising the indication that the fault processing has been performed by the network service.

16. The apparatus of claim 12, wherein the SOAP message comprises a mandatory header specifying that a fault must be generated where a SOAP processor associated with the network service understands and processes the mandatory header, the fault comprising the indication that the fault processing has been performed by the network service.

17. The apparatus of claim 1, wherein the status message comprises a message for invoking fault processing by the network service, wherein the response to the status message comprises an indication that the fault processing has been performed by the network service, the operational status monitor being further operable to determine the operational status of the network service based on whether the fault processing has been performed by the network service.

18. The apparatus of claim 1, wherein the network service is accessible through a network service virtual endpoint, wherein the status message is transmitted to a shadow endpoint that shadows the network service virtual endpoint.

19. The apparatus of claim 18, wherein the shadow endpoint is associated with an intermediary component through which the network service is accessible, wherein the intermediary component responds to the status message.

20. The apparatus of claim 1, wherein the status message comprises a status Remote Procedure Call (RPC).

21. The apparatus of claim 20, wherein the network service is accessible through an intermediary component, wherein the intermediary component receives the status message, examines the status message for the status RPC, processes the status RPC, and sends a response message in response to the status message.

* * * * *